United States Patent
Jarosz et al.

(10) Patent No.: US 11,455,982 B2
(45) Date of Patent: Sep. 27, 2022

(54) CONTEXTUAL UTTERANCE RESOLUTION IN MULTIMODAL SYSTEMS

(71) Applicant: Cerence Operating Company, Burlington, MA (US)

(72) Inventors: Slawek Jarosz, Senneville (CA); Cassandra Lee, Montreal (CA); Patrick Langer, Neu-Ulm (DE); Christian Ardelean, Montreal (CA); Mohammad Mehdi Moniri, Düsseldorf (DE)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 16/241,015

(22) Filed: Jan. 7, 2019

(65) Prior Publication Data
US 2020/0219491 A1    Jul. 9, 2020

(51) Int. Cl.
*G10L 15/18*    (2013.01)
*G06F 3/01*    (2006.01)
(Continued)

(52) U.S. Cl.
CPC .......... *G10L 15/1822* (2013.01); *G06F 3/017* (2013.01); *G10L 15/24* (2013.01); *G10L 2015/088* (2013.01)

(58) Field of Classification Search
CPC ....... G10L 15/08; G10L 15/083; G10L 15/10; G10L 15/12; G10L 15/14; G10L 15/142; G10L 15/144; G10L 15/146; G10L 15/148; G10L 15/16; G10L 15/18; G10L 15/1807; G10L 15/1815; G10L 15/1822; G10L 15/183; G10L 15/187; G10L 15/19; G10L 15/193; G10L 15/197; G10L 15/20; G10L 15/22; G10L 15/221; G10L 15/223; G10L 15/225; G10L 15/226; G10L 15/227; G10L 15/228; G10L 15/24; G10L 15/25; G10L 2015/088; G10L 2015/223; G10L 2015/225; G10L 2015/226; G10L 2015/227; G10L 2015/228; G10L 2015/24; G10L 2015/25; G10L 3/017; G10L 3/018; G10L 3/02; G10L 3/0237; G10L 3/0234; G10L 3/0232; G06F 3/01; G06F 3/011; G06F 3/013; G06F 3/014; G06F 3/03; G06F 3/017; G06F 3/018; G06F 3/02; G06F 3/0237; G06F 3/0234; G06F 3/0232; G06F 16/3329; G06F 3/167; G06F 40/20; G06F 40/30; G06F 3/16; G06F 16/332; B60R 25/257; B60R 16/0373; B60R 25/25;
(Continued)

(56) References Cited

U.S. PATENT DOCUMENTS

2002/0135618 A1*  9/2002  Maes ............... G10L 15/24
                                                          715/767
2005/0187437 A1*  8/2005  Matsugu ............ A61B 5/4803
                                                          600/301
(Continued)

*Primary Examiner* — Leshui Zhang
(74) *Attorney, Agent, or Firm* — Occhiuti & Rohlicek LLP

(57) ABSTRACT

A system and method of responding to a vocal utterance may include capturing and converting the utterance to word(s) using a language processing method, such as natural language processing. The context of the utterance and of the system, which may include multimodal inputs, may be used to determine the meaning and intent of the words.

23 Claims, 5 Drawing Sheets

(51) Int. Cl.
  *G10L 15/24* (2013.01)
  *G10L 15/08* (2006.01)
  *B60R 16/037* (2006.01)
  *B60R 25/25* (2013.01)
  *G06F 3/16* (2006.01)
  *G06F 16/332* (2019.01)
  *G10L 15/22* (2006.01)

(58) Field of Classification Search
  CPC ......... B60R 16/037; G60F 3/167; G60F 3/16; G60F 3/013; G60F 3/01
  USPC ........ 704/9, 257, 200, 200.1, 202, 203, 206, 704/208, 209, 210, 219, 231, 232, 233, 704/234, 235, 243, 244, 245, 246, 250, 704/251, 255, 261, 270, 270.1, 271; 710/1, 5, 7, 19, 62, 63, 65, 67, 72, 73
  See application file for complete search history.

(56) References Cited

U.S. PATENT DOCUMENTS

| | | | | |
|---|---|---|---|---|
| 2007/0005206 | A1* | 1/2007 | Zhang | G06F 3/16 701/36 |
| 2008/0015863 | A1* | 1/2008 | Agapi | G10L 15/22 704/275 |
| 2008/0091406 | A1* | 4/2008 | Baldwin | G10L 25/51 704/4 |
| 2009/0150156 | A1* | 6/2009 | Kennewick | G10L 15/00 704/257 |
| 2009/0164216 | A1* | 6/2009 | Chengalvarayan | B60R 16/0373 704/251 |
| 2010/0145700 | A1* | 6/2010 | Kennewick | G06F 16/3329 704/257 |
| 2010/0241431 | A1* | 9/2010 | Weng | G06F 3/038 704/257 |
| 2012/0265528 | A1* | 10/2012 | Gruber | G10L 15/183 704/235 |
| 2013/0138424 | A1* | 5/2013 | Koenig | G10L 21/00 704/9 |
| 2013/0158998 | A1 | 6/2013 | Bangalore et al. | |
| 2013/0275164 | A1* | 10/2013 | Gruber | G10L 17/22 705/5 |
| 2014/0019522 | A1* | 1/2014 | Weng | G06F 16/903 709/203 |
| 2014/0058584 | A1* | 2/2014 | Weng | G06F 3/038 701/1 |
| 2014/0267035 | A1* | 9/2014 | Schalk | G06F 3/0416 345/158 |
| 2014/0361973 | A1* | 12/2014 | Raux | G06F 3/013 345/156 |
| 2016/0055850 | A1 | 2/2016 | Nakadai et al. | |
| 2016/0091967 | A1* | 3/2016 | Prokofieva | G06K 9/00597 345/156 |
| 2017/0068659 | A1 | 3/2017 | Rothwell et al. | |
| 2019/0080686 | A1* | 3/2019 | Springer | G10L 15/22 |

* cited by examiner

UTTERANCE: "LOWER THE WINDOW"

RESPONSE: FRONT PASSENGER-SIDE WINDOW LOWERED

FIG. 5A

UTTERANCE: "LOWER THE WINDOW"

RESPONSE: FRONT PASSENGER-SIDE WINDOW LOWERED

FIG. 5B

UTTERANCE: "LOWER"

RESPONSE: FRONT PASSENGER-SIDE WINDOW LOWERED

FIG. 5C

UTTERANCE: "LOWER"

RESPONSE: LOWER VOLUME OF INFOTAINMENT SYSTEM

FIG. 5D

UTTERANCE: "LOWER"

RESPONSE: LOWER VOLUME OF INFOTAINMENT SYSTEM

FIG. 5E

UTTERANCE: "LOWER"

RESPONSE: LOWER VOLUME OF INFOTAINMENT SYSTEM

FIG. 5F

UTTERANCE: "LOWER"

RESPONSE: "WOULD YOU LIKE TO LOWER THE WINDOW, OR THE MUSIC VOLUME?"

FIG. 5G

CONTEXTUAL UTTERANCE RESOLUTION IN MULTIMODAL SYSTEMS

FIELD OF INTEREST

The present inventive concepts relate to the field of natural language understanding, and more particularly to utterance resolution.

BACKGROUND

Progress in human/machine interfaces has been astounding. Speech input, which has evolved from scripted, keyword, to increasingly natural language implementations, may be found in more and more electronic systems. Yet, the facility for understanding (or misunderstanding) displayed by the HAL 9000 in 1968's "2001: A Space Odyssey," remains somewhat elusive, these fifty years on.

An additional challenge arises, in that, in some electronic systems, multiple modes of input may be accepted, including haptic (touch), stylus (with written-word recognition), text, knob, or pushbutton, for example. In particular, motor vehicles, passenger and truck alike, increasingly employ multimodal input for driver assistance systems that greatly reduce the burdens placed on drivers and thereby increase driving pleasure and safety. Although great strides have been made in the field of speech recognition, many in-vehicle electronic assistant systems, or, simply, assistants, are incapable of interacting with people in a natural way. For example, even if a vocal utterance has been captured and accurately converted into words by a speech processing system, the meaning and intent of the utterance may still be unknown.

SUMMARY

In accordance with aspects of inventive concepts, a system may be responsive to a human utterance by capturing and converting the utterance to words, for example, in digital form. Once converted to words, the system analyzes the word(s) to determine the meaning and intent of the utterance using the context of the utterance and of the system. Such an analysis may include the determination of the object of a command, for example.

In example embodiments, a system and method in accordance with principles of inventive concepts may be implemented on an electronic platform that includes a user interface responsive to multimodal input. The platform may accept a user's utterance and employ natural language processing to determine the meaning, such as a query or command, of the utterance. In addition to vocal input, the platform may be responsive to a variety of input modes, such as haptic (touch), eye-tracking (gaze), stylus, button, knob, dial or other input mode, for example. Additional inputs may include sensors or other inputs that may characterize the current state of the platform or system (for example, driver assistant) with which it is associated. The system enhances natural language processing of voice input by employing the context of the utterance to disambiguate the utterance's meaning, intent, or object. The system may employ a hierarchical approach to such contextual disambiguation.

In example automotive system embodiments, a driver may issue an utterance, which may constitute a command or a query, to which the automotive system is to respond. According to principles of inventive concepts, the automotive system employs the context of the system and the user's utterance to resolve ambiguities within the utterance. In some embodiments the context used to disambiguate the utterance may include previous interactions with the automotive system or other factors that define the current state of the automotive system, for example.

In some embodiments, the system may store data related to multimodal inputs, including speech interactions, haptic (i.e., touch) interactions, gaze interactions, interactions with other automotive systems and automotive system status indicators, including automotive sensor readings, for example. Vehicular interactions may include, for example, turning the steering wheel, activation of emergency lights, operation of windshield wipers (when turned on, it may help to discern "raise" or "higher" when the user wants to raise the window or raise the radio volume based upon the stored data the system hierarchically engages the natural language processing to resolve the intent of a speaker's utterance.

Additional context factors and priorities are contemplated within the scope of inventive concepts. An alert (visual, audio, or otherwise) may be issued by a vehicle related to vehicular (e.g., engine temperature), trip (e.g., the need to refuel before reaching a destination), environmental (storm conditions ahead), a reminder, or other conditions. A user's response to the alert may be referred to as an "alert" context factor, which may be thought of as a sort of hybrid of a "recent antecedent" (with the interaction initiated by the vehicle) and, for example, a "gaze" context factor, wherein the user responds to an alert displayed on the vehicle's instrument cluster by looking at the cluster and uttering a query, such as, "what's that?" The system may respond by generating speech that describes the alert and its implications. An alert context factor, since it may be related to a vehicular or other emergency condition, may be addressed at the highest priority.

Other multimodal contextual interactions are contemplated within the scope of inventive concepts. For example, a passenger may employ a button positioned on a passenger door to lower her window, then utter "slightly higher," to which the system responds by raising the window slightly higher. When passing a billboard, the driver may utter the phrase, "what's that?" while looking at the billboard. The system may employ the driver's gaze to determine the object of her inquiry and perform optical character recognition upon the contents of the billboard to then generate speech which describes the content of the billboard. A driver may engage adaptive cruise control, which defaults to a predetermined distance between the driver's car and the car ahead. If the driver then utters, "More," the system may then increase the distance between the driver's car and the car ahead of it. A passenger may press the "seek" button on the radio to search for the next radio station (e.g., the station with next higher frequency having a clear signal) and, after that station is found, the passenger may utter, "next," to which utterance the system responds by searching for the next radio station. The driver may adjust the passenger compartment climate control fan manually using a dial or button, for example, then, after her hands have returned to the steering wheel, may utter, "Less," to which the system responds by lowering the fan speed. These examples are not meant to be exhaustive, other context factors (some of which may be combinations of other context factors) and priorities are contemplated within the scope of inventive concepts.

In example embodiments, a method of disambiguating a vocal utterance in a multimodal input system includes a processor storing context data, a processor receiving a vocal utterance and a processor applying context data to determine the meaning of the utterance.

In example embodiments, a method of disambiguating a vocal utterance in a multimodal input system includes a processor in an electronic vehicle system storing context data, receiving a vocal utterance and applying context data to determine the meaning of the utterance.

In example embodiments, a method of disambiguating a vocal utterance in a multimodal input system includes employing real-time context data.

In example embodiments, a method of disambiguating a vocal utterance in a multimodal input system includes a system being responsive to haptic input.

In example embodiments, a method of disambiguating a vocal utterance in a multimodal input system includes a system being responsive to gaze input.

In example embodiments, a method of disambiguating a vocal utterance in a multimodal input system includes a system being responsive to stylus input.

In example embodiments, a method of disambiguating a vocal utterance in a multimodal input system includes a system being responsive to text input.

In example embodiments, a method of disambiguating a vocal utterance in a multimodal input system includes employing embedded and cloud processing.

In example embodiments, a method of disambiguating a vocal utterance in a multimodal input system includes employing natural language processing to determine a word of the vocal utterance.

In example embodiments, a method of disambiguating a vocal utterance in a multimodal input system includes employing a recent antecedent interaction with the system as a context factor in applying context to the determination of the meaning of the utterance.

In example embodiments, a method of disambiguating a vocal utterance in a multimodal input system includes employing gaze data as a context factor in applying context to the determination of the meaning of the utterance.

In example embodiments, a method of disambiguating a vocal utterance in a multimodal input system includes employing current media playing data as a context factor in applying context to the determination of the meaning of the utterance.

In example embodiments, a method of disambiguating a vocal utterance in a multimodal input system includes employing the status of an associated system as a context factor in applying context to the determination of the meaning of the utterance.

In example embodiments, a method of disambiguating a vocal utterance in a multimodal input system includes employing the status of a vehicle as a context factor in applying context to the determination of the meaning of the utterance.

In example embodiments, a method of disambiguating a vocal utterance in a multimodal input system includes employing a sensor reading as an indication of the status of the vehicle.

In example embodiments, a method of disambiguating a vocal utterance in a multimodal input system includes employing a speech analysis technique including at least one of: voice activity detection, automatic speech recognition and natural language understanding.

In example embodiments, a system includes a multimodal input system for disambiguating a vocal utterance, including a processor to store context data, a processor to receive a vocal utterance, and a processor to apply context data to determine the meaning of the utterance.

In example embodiments, a system includes a multimodal input system for disambiguating a vocal utterance that includes a processor in an electronic vehicle system to store context data, to receive a vocal utterance and to apply context data to determine the meaning of the utterance.

In example embodiments, a system for disambiguation a vocal utterance that includes a multimodal input system is configured to employ real-time context data.

In example embodiments, a system for disambiguation a vocal utterance that includes a multimodal input system is responsive to haptic input.

In example embodiments, a system for disambiguation a vocal utterance that includes a multimodal input system is responsive to gaze input.

In example embodiments, a system for disambiguation a vocal utterance that includes a multimodal input system is responsive to stylus input.

In example embodiments, a system for disambiguation a vocal utterance that includes a multimodal input system is responsive to text input.

In example embodiments, a system for disambiguation a vocal utterance that includes a multimodal input system includes embedded and cloud processing.

In example embodiments, a system for disambiguation a vocal utterance that includes a multimodal input system is configured to employ natural language processing to determine a word of the vocal utterance.

In example embodiments, a system for disambiguation a vocal utterance that includes a multimodal input system is configured to employ a recent antecedent interaction with the system as a context factor in applying context to the determination of the meaning of the utterance.

In example embodiments, a system for disambiguation a vocal utterance that includes a multimodal input system is configured to employ gaze data as a context factor in applying context to the determination of the meaning of the utterance.

In example embodiments, a system for disambiguation a vocal utterance that includes a multimodal input system is configured to employ current media playing data as a context factor in applying context to the determination of the meaning of the utterance.

In example embodiments, a system for disambiguation a vocal utterance that includes a multimodal input system is configured to employ the status of an associated system as a context factor in applying context to the determination of the meaning of the utterance.

In example embodiments, a system for disambiguation a vocal utterance that includes a multimodal input system is configured to employ the status of a vehicle as a context factor in applying context to the determination of the meaning of the utterance.

In example embodiments, a system for disambiguation a vocal utterance that includes a multimodal input system is configured to employ a sensor reading as an indication of the status of the vehicle.

In example embodiments, a system for disambiguation a vocal utterance that includes a multimodal input system is configured to employ a speech analysis technique including at least one of: voice activity detection, automatic speech recognition and natural language understanding.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements.

The drawings are not necessarily to scale, emphasis instead being placed upon illustrating aspects of the invention. In the drawings:

FIG. 5a through 5g is a depiction of example utterances and responses in a multimodal input system employing context to resolve ambiguity in an utterance, in accordance with principles of inventive concepts.

DETAILED DESCRIPTION

Figure 1:
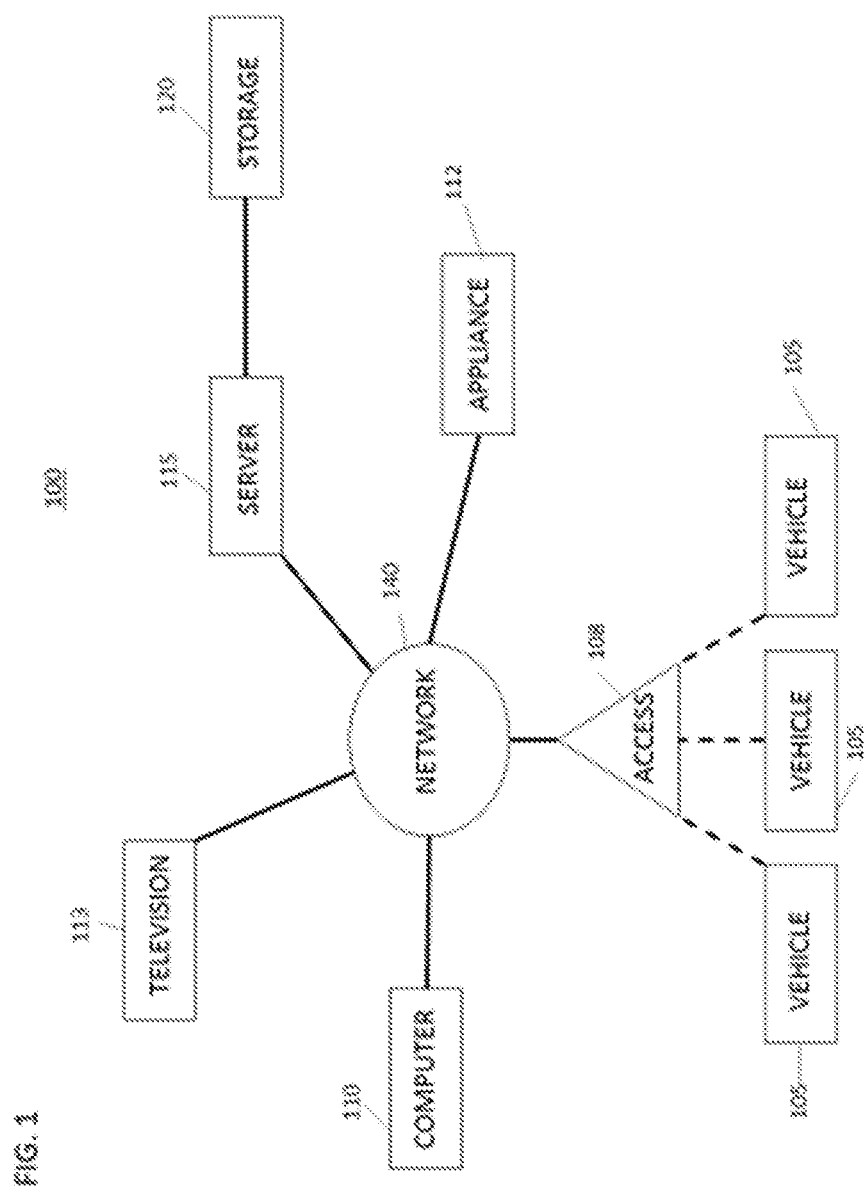
FIG. 1 is a block diagram of an embodiment of an architecture within which utterance disambiguation in a multimodal input system can be performed, in accordance with aspects of the inventive concepts.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items. The term "or" is not used in an exclusive or sense, but in an inclusive or sense.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor. Process steps illustrated in example flow charts may be executed in order(s) other than that illustrated and additional steps may be added or illustrated steps may be deleted without deviating from the spirit of inventive concepts.

A voice-controlled response platform, such as a command and reply platform, will now be described. The voice-controlled platform, or a portion thereof, may generally deployed on a user-accessible device located in the home, office, manufacturing space, entertainment venue, gym, medical, healthcare, or emergency environment, mobile electronic device, or vehicle; in short, anywhere a user may have voice interaction with an electronic device and may use voice input for control or query.

In the home, for example, voice input may be used to control or query appliances, such as radios, televisions, dishwashers, or refrigerators, or home systems, such as heating, cooling or plumbing systems. In the office, voice input may be used to control or query office equipment (e.g., copier) or office infrastructure (e.g., thermostat settings and temperature readings). In a manufacturing environment voice input may be used to control or query any of a variety of machines such as computer numeric control (CNC) machines, lathes, or grinders, for example. In a health club a user may employ voice interaction with exercise machines to control resistance, course length, course type, or to query a machine regarding the user's current performance or historical performance, for example. In a medical, healthcare, or emergency environment, voice input may be used to control or query various types of diagnostic, treatment, or monitoring equipment. In the vehicle, voice input may be used to control or query various systems and equipment within the vehicle, such as navigation, cruise control, communication, environmental, vehicle monitoring, and/or infotainment systems.

A system in accordance with principles of inventive concepts may accept a vocal utterance from a user, which may be a command or query, and process that utterance using a natural language processor to unambiguously determine the word or word-string that constitutes the utterance. That is, the natural language processor successfully interprets each word within the utterance. In an example in which the word, "lower" is uttered, assume that the natural language processor determines that the utterance includes the word "lower" and does not misinterpret the word (for example, as "mower"). An ambiguity may nevertheless arise if the speaker has not included sufficient information within the utterance for the system to respond to the utterance with a degree of certainty.

For example, if a driver vocally requests that an electronic vehicle platform "Lower the rear passenger side window, please," the system's natural language processor may correctly interpret each word within the utterance, recognize that the utterance is a command, recognize that the object of the command is a specific window (the rear passenger-side window) from among a plurality of windows within the vehicle, and recognize that the command is to lower the window. Should the user, instead, vocally request that the system "lower the window," an ambiguity arises inasmuch as the system is aware that any of a plurality of windows within the vehicle that could be the object of the command. This ambiguity arises, not out of the translation of the vocal utterance into a word (e.g., a digital representations of the spoken words), but out of uncertainty as to the meaning, intent, and object of the command. In this case, the natural language processor has unambiguously interpreted the spoken words, but ambiguity nevertheless exists.

A system and method in accordance with principles of inventive concepts employs the context of the utterance, including the context of the speaker and his environment, to resolve the ambiguity and thereby allow the system to respond appropriately. Even greater ambiguity may be introduced by a speaker simply commanding, "Lower." Again, a natural language processor may recognize, without ambiguity, the word "lower," but be unable to determine upon which of several objects (any of a plurality of windows, a seat, the volume of an infotainment center, etc.) to carry out the command. And, again, a system in accordance with principles of inventive concepts may employ the context of the utterance to resolve the issue.

Enabling the disambiguation of utterances in this manner affords a system the capability of providing a much more natural user voice interface. Rather than requiring a speaker to recite with great precision exactly which object is to be acted upon and how, a system may respond accurately to an utterance that is both natural and ambiguous.

In example embodiments, a system may establish context for the disambiguation of utterances by storing data related to a speaker and to the environment within which utterances are made. To resolve ambiguities that remain after a natural language processor has operated upon the utterance, in order to correctly interpret the meaning, intent, or object of a word or word stream, the system recalls the data to establish the context of the utterance and uses the context to disambiguate the utterance. The system may hierarchically apply various factors of the context to resolve the ambiguities.

In vehicles, a user may employ voice interaction to command or query any of a variety of vehicular systems, including infotainment systems, vehicular environment systems, or other vehicle status and control systems. For clarity and brevity of description, example embodiments will primarily be limited to those involving voice interaction in a vehicular environment. However, inventive concepts are not limited thereto and may be applied to any electronic system that accommodates voice input.

FIG. 1 and the following discussion provide a brief, general description of a suitable computing environment 100 in which a voice-controlled electronic vehicle platform can be implemented. Although not required, aspects and implementations of inventive concepts will be described in the general context of computer-executable instructions, such as routines executed by a general-purpose computer or a mobile device or, more particularly, a motorized vehicle electronic system such as a head unit or infotainment system. Those skilled in the art will recognize that portions of the invention may reside on a server computer, while corresponding portions reside on a client computer. A voice-controlled electronic vehicle platform captures voice input from a user, typically in the form of an inquiry or command, and responds to the user by executing the command or providing information requested by a query.

Referring to the example of FIG. 1, a voice-controlled electronic vehicle platform operates in or among one or more computing devices, such as electronic vehicle platforms 105, computer 110, appliance 112, or television 113, or server 115. The computing device may be deployed in vehicles, airplanes, ships and other environments.

For example, a vehicle electronic platform may include a computing system that is responsive to driver utterances and other, multimodal, input delivers information or executes commands in response to the driver's question or command.

The electronic vehicle platforms 105, computer 110, appliance 112, and television 113 include a network card or radio or another device that enables them to communicate through one or more networks 140, and include audio input and output devices such as one or more microphone and speakers. The electronic vehicle platforms 105, computer 110, appliance 112, and television 113 communicate via the network 140 with a server 115. A data storage area 120 coupled to the server 115 contains data pertaining to the voice-controlled electronic vehicle platform, and software necessary to perform functions of these systems. In example embodiments a voice controlled vehicle system may be a hybrid system, including elements on server 115 and electronic vehicle platform, for example.

The electronic vehicle platform 105 may communicate wirelessly with a base station or access point 108 using a wireless mobile telephone standard, such as the Global System for Mobile Communications (GSM, or later variants such as 3G or 4G), or another wireless standard, such as IEEE 802.11, and the base station or access point 108 communicates with the server 115 via the networks 140. The computer 110, appliance 112, and television 113 communicate through the networks 140 using, for example, TCP/IP protocols. The electronic vehicle platforms 105, computer 110, appliance 112, and television 113 may also communicate with one another over a short-range wireless standard, such as Bluetooth. In example embodiments a system may employ embedded elements (i.e., contained within the electronic vehicle platform 105) and cloud elements (i.e., accessed through networks 140).

Although the following description will focus primarily on vehicular embodiments, the inventive concepts can, in some embodiments, be applied to other types devices and systems, which can include, but are not limited to, mobile phones, tablets, phablets, personal computers, laptop computers, televisions (including smart televisions), home systems and appliances, office, manufacturing, warehousing, equipment and systems, and the like, as previously indicated. When the description herein refers to vehicles, vehicle head units, or electronic vehicle platforms it is to be understood that the same description could also be applied to other types of voice-responsive devices, such as those mentioned above, unless otherwise stated.

Figure 2:
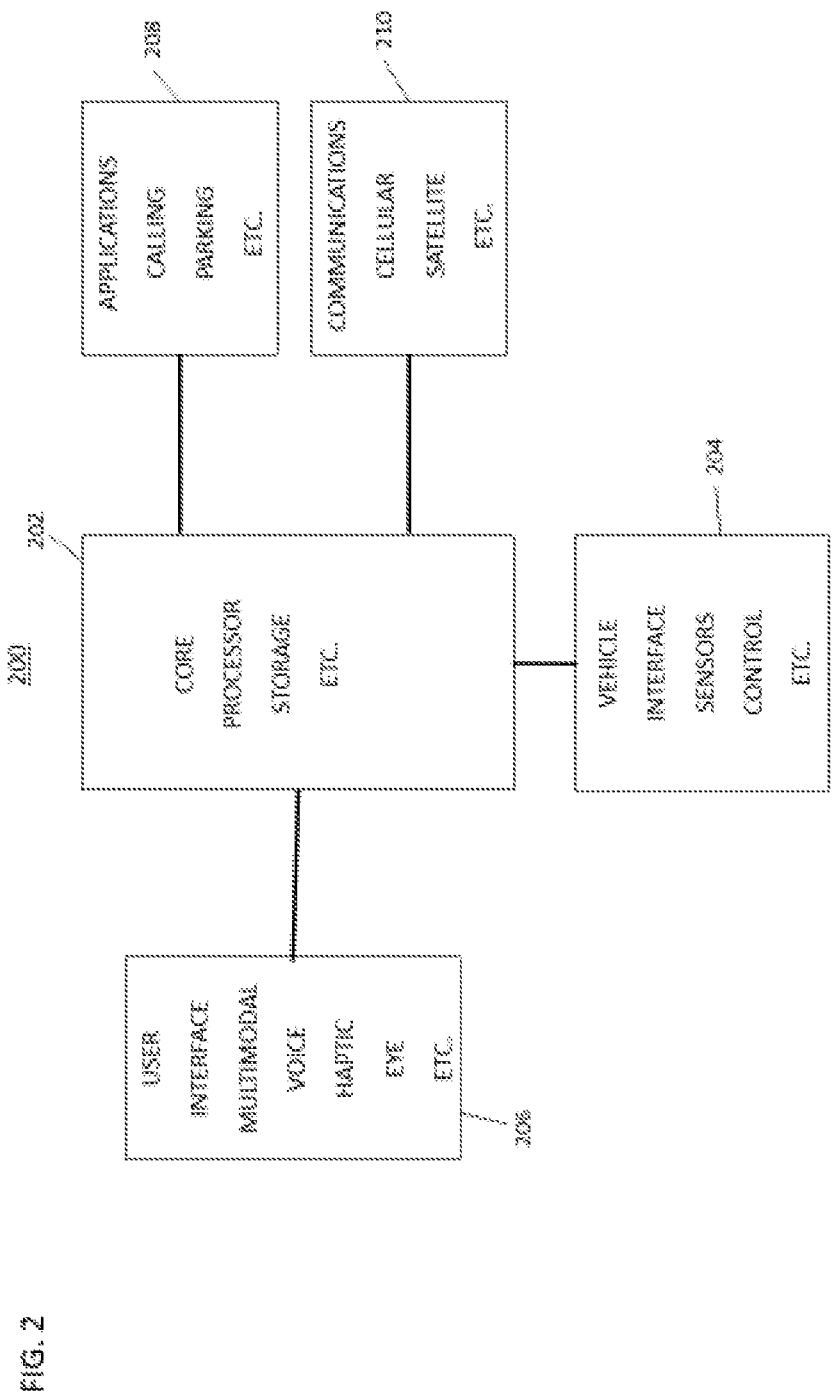
FIG. 2 is a block diagram of vehicular embodiment of a multimodal input contextual utterance resolver, or disambiguator, in accordance with aspects of the inventive concepts.

FIG. 2 is a block diagram of an example embodiment of an electronic vehicle platform 200 in accordance with principles of inventive concepts. In example embodiments platform 200 may be implemented in vehicle head unit, or deck, that is a component of an infotainment system, which provides a unified hardware interface for an electronic vehicle system. The vehicle head unit has evolved over the years to become the "nerve center" or "brains" of modern vehicles. The platform 200 includes: a core 202, vehicle interface 204, user interface 206, application suite 208, and communications link 210.

The core 202 includes a processor, storage and software and firmware to perform core functions of the system, including those associated with an operating system, data storage and basic communications. Hardware associated with the core 202 may including any of a variety of technologies, including special purpose processors, application specific integrated circuits, microcontrollers, microprocessors, dynamic memory, nonvolatile memory, disk drives, solid state drives, etc.

Vehicle interface 204, includes sensors that provide data to the platform and control mechanisms for operating vehicle components. Sensors may include those that provide information or readings related to: global positioning systems (GPS), tire pressure sensors, multi-axis accelerometers, oil temperature, coolant temperature, exterior temperature, passenger compartment temperature, velocity, load balance, or suspension status, for example. Control mechanisms may include knobs, buttons, cranks, or electromechanical devices that operate windows, seat positions, acceleration, braking, and auxiliary functions such as lights (interior, exterior) wipers, and horns, for example.

User interface 206 may provide a multimodal interface for interaction with a user. The multimodal interface may include, for example, one or more microphones for voice or other input, voice recognition, touch (haptic) input, eye-tracking input, push button input, knob input, trackball input, stylus input, mouse input, or motion sensing, gesture recognition and pointing sensors, for example, for input. The multimodal interface may provide a variety of displays, including heads up displays on a window or projection target, head unit displays, audio output, or tactile output, for example. User interface 206 may also include speech signal enhancement, automatic speech recognition, natural language understanding, text-to-speech, voice biometry and cognitive arbitration, for example.

Application suite 208 may include calling (e.g., a cellular telephone application), music, gas station location, parking location, weather, news, car manual, and office applications, for example.

Communications link 210 may include links to network 140 through which the system may access the cloud and cloud-based functionality provided by server 115. The communications link 210 also allows the system to acquire information related to points of interest, the passing surroundings, weather specific to the area or weather along the planned route, etc. In hybrid embodiments some aspects of system operation may be shared between embedded functions carried out in platform 105 and functions carried out through network 140 and cloud functionality provided by server 115. For example, various grammars for natural language processing or other features may be maintained on server 115 and provided for embedded use.

User interface 206 may employ a variety of audio processing technologies, including: acoustic echo cancellation, duplex speech, in-car/vehicle communications, multiple input/multiple output channels, passenger interference cancellation, residual echo suppression, and wind buffeting suppression.

The system's voice control, enhanced by contextual utterance resolution in accordance with principles of inventive concepts, may include free-format natural speech input, unified destination entry, "barge-in" (allowing a user to interrupt a system response with follow-on input, for example) and top-level menu support for all domains. For example, a user may say, "Drive to Madison Square Garden and send the ETA to my brother." In this single utterance, the user has instructed the system to launch the navigation system, identify the address of a named point of interest, calculate when the destination will be reached, switch to the messaging domain, interpret from a "contacts" domain who the user's brother is and, compose a text message incorporating data from the navigation system; all of which may be enhanced by the system's use of contextual utterance resolution.

Once speech has been captured and accurately converted into words, the system analyzes it for meaning and intent. To perform natural language understanding of the utterance, a recognized utterance may be associated with a known domain (e.g., field of action, thought, or topic) to have the highest probability of matching the user's intent. Artificial intelligence (AI) reasoning may also be applied to employ pre-defined or learned user preferences to further clarify the meaning and intent of the user's utterance and contextual information, such as real-time contextual information may be applied to further enhance the determination of the utterance's meaning, intent and (in the case of a command) the object of the intent.

Voice biometry may be employed the electronic vehicle platform to authenticate and protect transactions, to identify users, distinguish users from one another, link users' voices to individual profiles and permissions, protect personal data and to allow a plurality of users, drivers and passengers, to interact with the platform, simultaneously and in ways specific to each person.

In example embodiments, voice input may be invoked using push-to-talk (activating a button on a steering wheel, for example), by employing a wake-up word, or through an active listening mode in which the system stands by and awaits voice input from the user. In the active listening mode the system the automatic speech recognition and natural language understanding systems actively monitor speech in the vehicle, filter out audio from the infotainment system and wait for words, phrases and grammars that it recognizes and command related to a domain that it understands and can respond to.

In addition to speech input, a system may accept multimodal input, for example, from a variety of systems and sensors in addition to voice and haptic through use of text prediction and correcting (for text input), handwriting recognition in combination with intuitive predictive text (for stylus input), and eye/head tracking recognition (for "gaze" input). The system's multimodal interaction combines eye trajectory and head angle with car positioning and three dimensional environmental modeling to track users' gaze and allows the system to respond to users' inputs with an accurate, contextual response without the need for prompts, scripts or keywords. A system in accordance with principles of inventive concepts employs the context of the user's utterance to properly interpret the meaning and intent of the utterance. Particular use may be made of the real time context of the utterance, including the current and prior (within a threshold period) user interaction and vehicle systems' current status.

The system may employ cognitive arbitration to route a command through an appropriate device or electronic assistant. For example, the system may recognize that a request to unlock a back door at the user's home would best be effected by the user's smart home system and pass that command along to the user's smart home system.

An electronic vehicle platform in accordance with principles of inventive concepts may store vehicular data, which may be provided through the vehicle interface 204, such as sensor readings and control mechanism status. Such information may include data and metadata (for example, time stamps, location, etc.) related to sensors, control mechanisms and a vehicle's native application and may form a basis for the context in which vocal utterances, such as commands and queries, are analyzed according to principles of inventive concepts and may be embedded, for example, in the vehicle's head unit.

Figure 3:
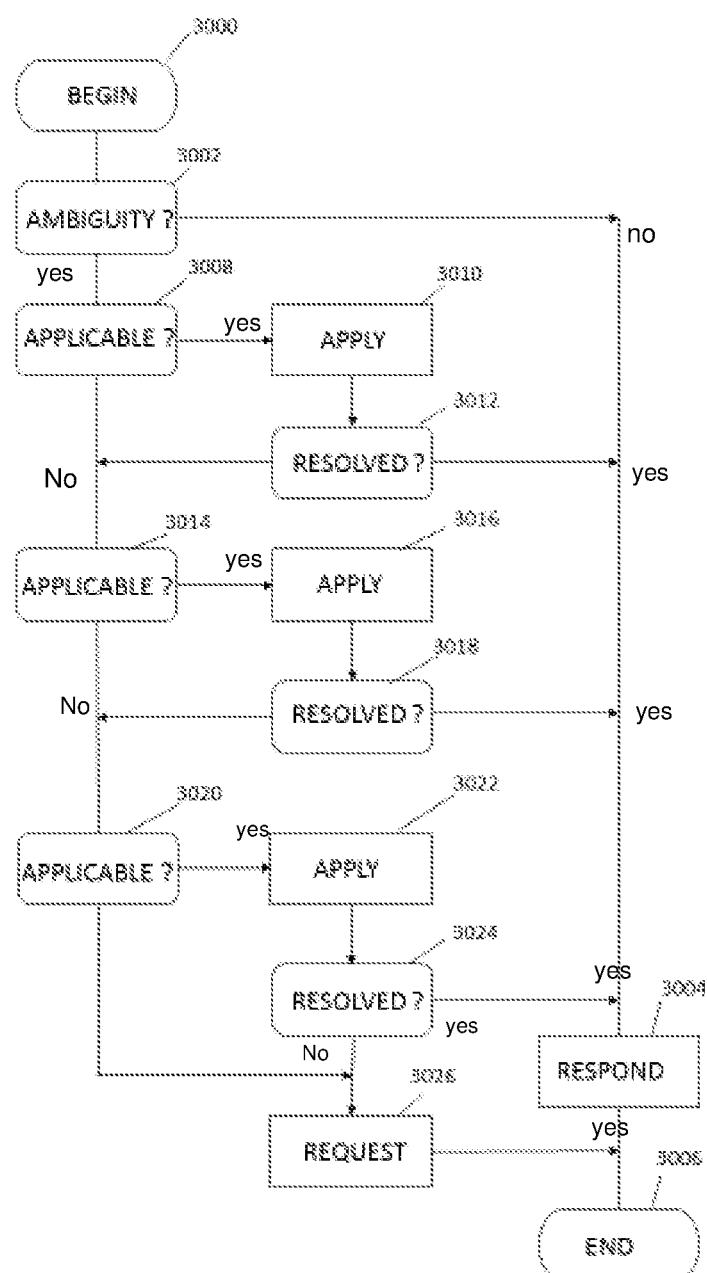
FIG. 3 is a flow chart of an example process in which context is employed to resolve utterance ambiguity in a multimodal input system, in accordance with principles of inventive concepts.

In example embodiments a system may process utterances according to a process as depicted in the flow chart of FIG. 3. The process begins in step 3000 and proceeds from there to step 3002 where the system determines whether there is ambiguity regarding the current utterance; the question being whether the system can adequately respond to the utterance. As previously described, ambiguity may remain regarding an utterance even though the word or word-string constituting the utterance has been unambiguously interpreted (e.g., converted to a word string). If no ambiguity remains in the utterance, the process proceeds to step 3004, where the system executes a response (e.g., a command execution or query response) that is appropriate to the utterance. From there, the process proceeds to step 3006, where the process ends.

Should the system determine in step 3002 that ambiguities remain in the utterance, and that the system cannot adequately respond to the utterance (e.g., as determined by a confidence threshold produced by the system), the process proceeds to step 3008, where the system determines whether a first in a hierarchical, or ordered, list of context factors is tested to determine whether it is applicable to resolve the utterance ambiguity. The term "context factor" is employed herein to describe an element of the utterance, of a user's interaction, of the vehicle platform or of the vehicle itself (e.g., accelerometer reading or outside temperature), that may be used to define the context of the utterance. As mentioned elsewhere, the context may be, in some embodiments, a "real-time" context, dealing with interactions, events, sensor readings or other data within a threshold time period, for example.

It is contemplated within the scope of inventive concepts that only one context factor may be employed, that different hierarchies (or no hierarchies) of context factors are employed. If the first context factor is applicable, the process proceeds to step 3010 where the first context factor is applied to the utterance in order to address the remaining utterance ambiguity. After application of the first context factor, the process proceeds to step 3012 where the system determines whether application of the first context factor has successfully resolved the utterance ambiguity, using, for example, a system confidence threshold. If the utterance ambiguity has been resolved, the process proceeds to step 3004 and from there as previously described.

If the utterance ambiguity has not been resolved, the process proceeds to step 3014, where the next context factor is tested to determine whether it is applicable to resolve the ambiguity. In example embodiments the step of determining the efficacy of the application of the first (or any subsequent) context factor is optional and a default may be, simply, to apply the first context factor and proceed to respond to the utterance in step 3004 without determining the efficacy of the application of the first context factor. Additionally, in alternative embodiments, if the utterance ambiguity has not been resolved, the process may proceed to step 3026 to request further information from the user in order to resolve the utterance ambiguity rather than proceed to step 3014 (or other subsequent steps) to determine whether the next context factor is applicable in resolving the utterance ambiguity.

In step 3014 the system tests the second context factor to determine whether it is applicable to resolve the utterance ambiguity. If the second context factor is applicable, the process proceeds to step 3016, where the second context factor is applied to the utterance to address the remaining utterance ambiguity. After application of the second context factor the process proceeds to step 3018 where the system determines whether application of the second context factor has successfully resolved the utterance ambiguity. If the utterance ambiguity has been resolved, the process proceeds to step 3004, and from there as previously described.

If the utterance ambiguity has not been resolved, the process proceeds, as before, through context factors until, in step 3020, the process reaches the final, $N^{th}$, context factor, which is tested to determine whether it is applicable to resolve the utterance ambiguity. If the $N^{th}$ context factor is applicable to resolution of the utterance ambiguity, the process proceeds to step 3022, where the context factor is applied and, from there, to step 3024, where the efficacy of this application is tested. If the utterance ambiguity has been resolved by application of the $N^{th}$ context factor in step 3024, the process proceeds to step 3004, and from there, as previously described. If the application of the Nth context factor has not resolved the utterance ambiguity, the process proceeds to step 3026, where the system requests more information or a repeat of the utterance and, from there, as previously described.

An example embodiment in which "recent antecedent," "current gaze target," and "current media playing," are context factors will now be described in reference to the flow chart of FIG. 4. The context factor "recent antecedent" refers to the most recent interaction a user has had with the system. This action may employ any mode of interaction, such as dialog, touch (haptic), stylus, car control (e.g., window control button), etc. In example embodiments, in order for this context factor to be applicable the interaction must have taken place within a threshold period of time. The threshold period may be configurable, may be adjustable, and may have a default value. In example embodiments the default value may be ten seconds, but other threshold defaults are contemplated within the scope of inventive concepts. Additionally, other thresholds are contemplated within the scope of inventive concepts, such as, for example, a threshold number of events, such as sensor readings from the system, or other system input may be employed as a threshold.

The context factor "current gaze target" may be related to an eye tracking system, such as previously described. The target may be a windshield widget (for example, in a heads-up display), the head unit, any point on the vehicle, an exterior point of interest, any location inside or outside the vehicle, including the road ahead or a vehicle ahead, for example. In example embodiments, in order for the current gaze target to be applicable, the system may determine whether it can distinguish the most prominent element, or "main target" of the identified general gaze target. If this cannot be determined, if, for example, a feature on a screen is not the most prominent feature on the screen, although the eye tracker indicates that the user is looking in that general direction, that feature may not allow application of the current gaze target for disambiguation. In other words, the current gaze target cannot be unambiguously identified in such a case and the context factor, "current gaze target," may not be applicable. In this example embodiment "current gaze target" is the second in the ordered list of context factors to be applied to the utterance and is applied if "recent antecedent" context factor is not applied.

The context factor, "current media playing," refers to the content, a song for example, currently playing on the vehicle's infotainment system. In this example embodiment, "current media playing" is the last of the ordered list of context factors to be applied to the utterance and is applied if neither the "recent antecedent" nor "current gaze target" is applied.

Figure 4:
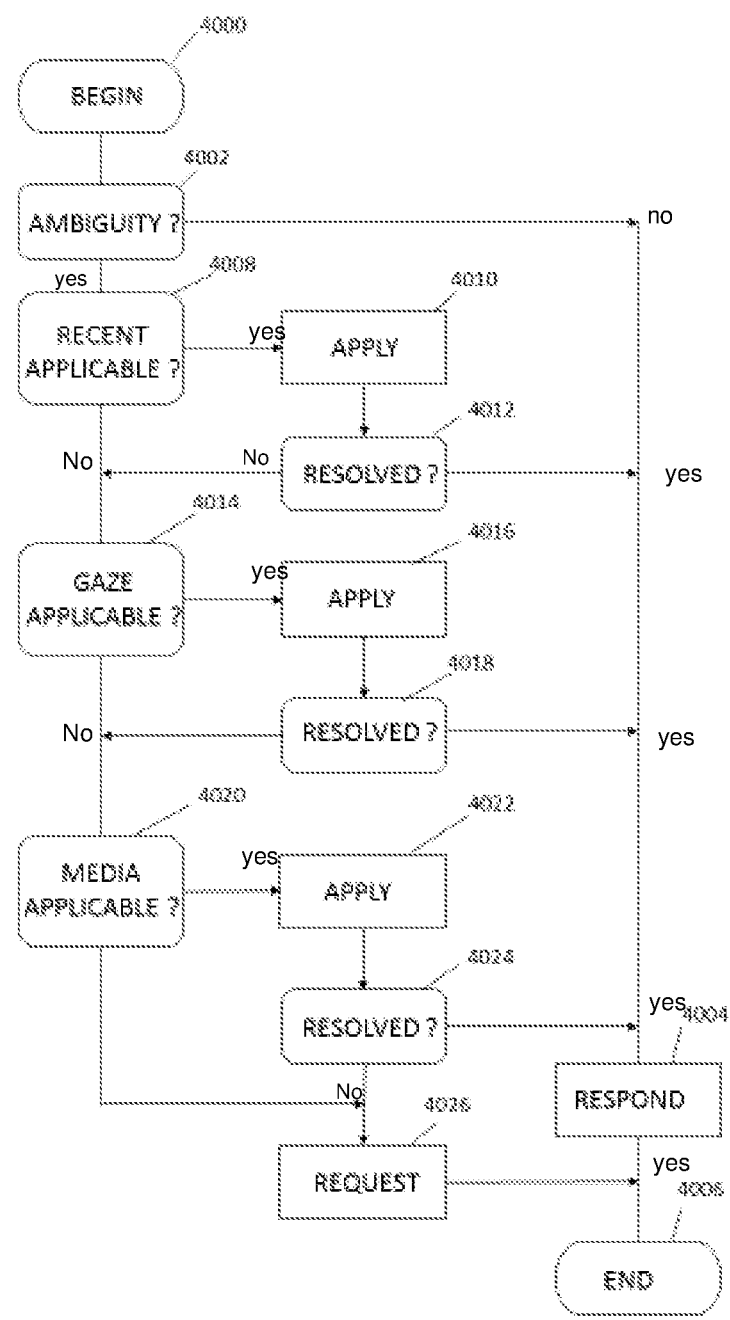
FIG. 4 is a flow chart of an example process in which context is employed to resolve utterance ambiguity in a multimodal input system, in accordance with principles of inventive concepts.

In example embodiments, a system may process utterances using the context factors "recent antecedent," "current gaze target," and "current media playing" according to a process as depicted in the flow chart of FIG. 4. The process begins in step 4000 and proceeds from there to step 4002, where the system determines whether there is ambiguity regarding the current utterance. As previously described, ambiguity may remain regarding an utterance even though the word or word-string constituting the utterance has been unambiguously interpreted. If no ambiguity remains in the utterance, the process proceeds to step 4004, where the system executes a response (e.g., a command execution or query response) that is appropriate for the utterance. From there, the process proceeds to step 4006, where the process ends.

Should the system determine in step 4002 that ambiguities remain in the utterance, and that the system cannot adequately respond to the utterance, the process proceeds to step 4008, where the system determines whether the "recent antecedent" context factor is applicable to resolve the utterance ambiguity. If the "recent antecedent" context factor is applicable, the process proceeds to step 4010 where the "recent antecedent" context factor is applied to the utterance in order to address the remaining utterance ambiguity. After application of the "recent antecedent" context factor, the process proceeds to step 4012 where the system determines whether application of the first context factor has successfully resolved the utterance ambiguity. If the ambiguity has been resolved, the process proceeds to step 4004 and from there as previously described.

If the ambiguity has not been resolved, the process proceeds to step 4014, where the "current gaze target" context factor is tested to determine whether it is applicable to resolve the utterance ambiguity. If the "current gaze target" context factor is applicable, the process proceeds to step 4016 where the "current gaze target" context factor is applied to the utterance to address the remaining utterance ambiguity. After application of the "current gaze target" context factor the process proceeds to step 4012 where the system determines whether application of the "current gaze target" context factor has successfully resolved the utterance ambiguity. If the ambiguity has been resolved, the process proceeds to step 4004, and from there as previously described.

If the ambiguity has not been resolved, the process proceeds to step 4020, where the process encounters the "current media playing" context factor, which is tested to determine whether it is applicable to resolve the utterance ambiguity. If the "current media playing" context factor is applicable to resolution of the utterance ambiguity, the process proceeds to step 4022, where the "current media playing" context factor is applied and, from there, to step 4024, where the efficacy of this application is tested. If the utterance ambiguity has been resolved by application of the "current media playing" context factor in step 4024, the process proceeds to step 4004, and from there, as previously described.

If the application of the "current media playing" context factor has not resolved the utterance ambiguity, the process proceeds to step 4026, where the system requests more information or a repeat of the utterance and, from there, as previously described.

The utterance/response pairs of FIGS. 5a through 5g illustrate example applications of a contextual utterance resolver in a multimodal system in accordance with principles of inventive concepts.

In some embodiments the system responds to the utterance of FIG. 5a, "lower the window," by lowering the front passenger side window of the vehicle. In this example, the system has retrieved multimodal information indicating that the speaker is located in the front passenger seat. The system may determine the speaker's position, for example, by triangulating which of a plurality of microphones within the past passenger compartment is nearest the person speaking. In this example, the context factor "speaker location," and microphone input mode are used to disambiguate the utterance "Lower the window," resolving the question of which window to lower.

The identical utterance, "lower the window," of FIG. 5b results in the same response (i.e., the system lowers the front passenger side window) but, in this example, it is the driver issuing the command. In this example the system employs the driver's gaze target context factor and eye tracking input mode to resolve the ambiguity of which window to lower.

In FIG. 5c the utterance "lower" elicits the response of the system of lowering the passenger side window. In this example, the passenger had previously lowered the window (for example, using a button, vocal, or other input mode) and wanted the window to be even lower. With the passenger uttering "lower," the utterance would clearly be ambiguous, not due to any fault in the translation from voice to digital representation, but due to a lack of information regarding the object of the command. By employing a "recent antecedent" context factor, the system is able to appropriately respond to the speaker's otherwise ambiguous command.

In FIG. 5d the system responds to the identical command, "lower," by lowering the volume of the infotainment system. In this example, the system has employed the driver gaze contacts factor, after determining that she had glanced at a music player widget on the vehicle windshield heads up display, to resolve the ambiguity of the "Lower" utterance.

Yet another example of the system's response to the command "Lower," one that reinforces both the ambiguity of the utterance and the power of the system's contextual analysis, is displayed in FIG. 5e. In this case the system lowers the volume of the infotainment system using a "recent antecedent" context factor, available because the driver had recently selected a song from the system using a touchscreen mode of input.

In the scenario of FIG. 5f the driver utters "Lower" and the system responds by reducing the volume of the infotainment system using a recent antecedent context factor. In this case, the driver had selected a song from the infotainment system using the utterance, "Play Led Zeppelin," and then requested a lower volume by uttering, "Lower." The system used the selection of the previous utterance, "Play Led Zeppelin" to trigger the "recent antecedent" context factor in response to the vocal input mode of the request.

The system's response to the utterance of FIG. 5g, "lower" demonstrates a situation in which the recent antecedent context factor cannot be employed. In this case, the user had requested that the system "play Led Zeppelin" and the system responded by playing a Led Zeppelin song. After some time, a period of time greater than the "recent antecedent" threshold time period, the driver utters "lower." In this case, because the "recent antecedent" context factor threshold has been exceeded, the recent antecedent context factor may not be employed. Additionally, in this scenario the context factor "current media" is not being employed. As result, the system requests clarification by responding aurally with, "Would you like to lower the window, or the music volume?"

While the foregoing has described example embodiments, it is understood that various modifications can be made therein and that the invention or inventions may be implemented in various forms and embodiments, and that they may be applied in numerous applications, only some of which have been described herein. For example, additional context factors and priorities are contemplated within the scope of inventive concepts. An alert (visual, audio, or otherwise) may be issued by a vehicle related to vehicular (e.g., engine temperature), trip (e.g., the need to refuel before reaching a destination), environmental (storm conditions ahead), a reminder, or other conditions. A user's response to the alert may be referred to as an "alert" context factor, which may be thought of as a sort of hybrid of a "recent antecedent" (with the interaction initiated by the vehicle) and, for example, a "gaze" context factor, wherein the user responds to an alert displayed on the vehicle's instrument cluster by looking at the cluster and uttering a query, such as, "what's that?" The system may respond by generating speech that describes the alert and its implications. An alert context factor, since it may be related to a vehicular or other emergency condition, may be addressed at the highest priority.

Other multimodal contextual interactions are contemplated within the scope of inventive concepts. For example, a passenger may employ a button positioned on a passenger door to lower her window, then utter "slightly higher," to which the system responds by raising the window slightly higher. When passing a billboard, the driver may utter the phrase, "what's that?" while looking at the billboard. The system may employ the driver's gaze to determine the object of her inquiry and perform optical character recognition upon the contents of the billboard to then generate speech which describes the content of the billboard. A driver may engage adaptive cruise control, which defaults to a predetermined distance between the driver's car and the car ahead. If the driver then utters, "More," the system may then increase the distance between the driver's car and the car ahead of it. A passenger may press the "seek" button on the radio to search for the next radio station (e.g., the station with next higher frequency having a clear signal) and, after that station is found, the passenger may utter, "next," to which utterance the system responds by searching for the next radio station. The driver may adjust the passenger compartment climate control fan manually using a dial or button, for example, then, after her hands have returned to the steering wheel, may utter, "Less," to which the system responds by lowering the fan speed. These examples are not meant to be exhaustive, other context factors (some of which may be combinations of other context factors) and priorities are contemplated within the scope of inventive concepts.

It is intended by the following claims to claim that which is literally described and all equivalents thereto, including all modifications and variations that fall within the scope of each claim.

It is appreciated that certain features of inventive concepts, which are, for clarity, described in the context of separate embodiments, may also be provide in combination in a single embodiment. Conversely, various features of inventive concepts, which are, for brevity, described in the context of a single embodiment may also be provided separately or in any suitable sub-combination. For example, it will be appreciated that all of the features set out in any of the claims (whether independent or dependent) can combined in any given way.

What is claimed is:

1. A method comprising: storing context data in a computer-readable medium, wherein the context data that are stored include data related to multimodal inputs, interactions with automotive systems, and automotive system status indicators, wherein said automotive system status indicators comprise automotive sensor readings; receiving a first utterance via a microphone, wherein said first utterance is a command given to a system that is selected from the group that consists of an infotainment system, a vehicular environment system, and a vehicle status-and-control system; and causing a computer-system having a multi-modal input to carry out a process for disambiguating the first utterance; wherein the process for disambiguating the first utterance comprises causing the computer-system having the multi-modal input to carry out the steps of applying the context data to the first utterance and determining a meaning of the first utterance based at least in part on the context data,
wherein said context data comprises context factors,
wherein applying context data to said first utterance is carried out after having determined that said first utterance remains ambiguous,
wherein determining said meaning comprises, after having applied said context data, determining that said first utterance is no longer ambiguous,
wherein said method further comprises responding to said first utterance,
said method further comprising, after having caused said computer-system to carry out the process for disambiguating said first utterance, receiving a second utterance,
determining that said second utterance is unambiguous,
responding to said second utterance without application of said context data,
receiving a third utterance,
applying said context data to said third utterance,
determining that said third utterance remains ambiguous, and
requesting further information from a driver and/or a passenger in a vehicle that comprises said computer-system.

2. The method of claim 1, wherein applying said context data to said first utterance comprises applying a first context factor, determining that application of said first context factor fails to resolve said ambiguity, applying a second context factor, and determining that application of said second context factor has resolved said ambiguity.

3. The method of claim 1, wherein applying said context data to said first utterance comprises applying a recent antecedent, said recent antecedent being data indicative of a most recent interaction of an utterer of said first utterance with said computer-system, said recent interaction comprising an input on one mode of said multi-modal input.

4. The method of claim 3, wherein, prior to applying said context data, a time interval between said recent antecedent and said first utterance is determined to be less than a threshold period of time.

5. The method of claim 1, wherein the computer-readable medium in which the context data was stored is in an electronic vehicle-platform that comprises a head unit, a core, a vehicle interface, and a communications link, wherein the head unit is a component of an infotainment system, wherein the head unit is configured to execute an application suite, wherein the core comprises a processor, storage, software, and firmware to perform core functions of the system, and wherein the vehicle interface comprises sensors that provide data to the electronic vehicle-platform and that control mechanisms for operating vehicle components.

6. The method of claim 1, further comprising causing the computer-system to receive an input indicative of a gaze direction, wherein determining the meaning comprises determining the meaning based at least in part on said input.

7. The method of claim 1, further comprising causing the computer-system to receive an input selected from the group consisting of a stylus input, a haptic input, and a text input, wherein determining the meaning comprises determining the meaning based at least in part on the input.

8. The method of claim 1, further comprising causing the computer-system to respond to text input.

9. The method of claim 1, wherein disambiguating the first utterance comprises using embedded processing and using cloud processing and wherein embedded processing comprises using embedded elements that are contained within an electronic vehicle-platform.

10. The method of claim 1, further comprising using natural language processing to determine a word of the first utterance.

11. The method of claim 1, further comprising using a recent antecedent interaction with the computer-system as a context factor in applying context to the determination of the meaning of the first utterance.

12. The method of claim 1, further comprising using gaze data as a context factor in applying context to the determination of the meaning of the first utterance.

13. The method of claim 1, further comprising using current media-playing data as a context factor in applying context to the determination of the meaning of the first utterance.

14. The method of claim 1, further comprising using an associated system's status as a context factor in applying context to the determination of the meaning of the first utterance.

15. The method of claim 14, further comprising using a vehicle's status as a context factor in applying context to the determination of the meaning of the first utterance.

16. The method of claim 15, further comprising using a sensor reading as an indication of the vehicle's status.

17. The method of claim 1, wherein determining the meaning of the first utterance comprises using a speech analysis technique selected from the group consisting of voice activity detection and natural language understanding.

18. An apparatus comprising a multi-modal system for disambiguating utterances received via a microphone, said utterances comprising first, second, and third utterances, said second utterance having been received after said first utterance and said third utterance having been received after said second utterance, each of said utterances being a command given to a system that is selected from the group that consists of an infotainment system, a vehicular environment system, and a vehicle status-and-control system, wherein said multi-modal system is configured to store context data in a computer-readable medium, wherein said context data comprises context factors, data related to multimodal inputs received by said multi-modal system, data related to interactions with automotive systems, and data related to automotive system status indicators that comprise automotive sensor readings, wherein said multi-modal system is further configured to apply said context data for determining a meaning of each of said first, second, and third utterances, said context data being applied to said first utterance after having determined that said first utterance remains ambiguous, wherein determining a meaning of said first utterance comprises, after having applied said context data to said first utterance, determining that said first utterance is no longer ambiguous, wherein said multi-modal system is further configured to respond to said first utterance and, after having disambiguated said first utterance, to receive said second utterance, to determine that said second utterance is unambiguous, and to respond to said second utterance without application of said context data, wherein said multi-modal system is further configured to receive said third utterance, to apply said context data to said third utterance, to determine that said third utterance remains ambiguous, and to request further information from a driver and/or a passenger in a vehicle that comprises an infotainment system.

19. The apparatus of claim 18, further comprising a vehicle, wherein said system is mounted in said vehicle.

20. The apparatus of claim 18, wherein the system is responsive to at least one of a stylus input, a haptic input, and a text input to determine the meaning of the utterance.

21. The apparatus of claim 18; wherein said system is configured to carry out both embedded processing and cloud processing.

22. The apparatus of claim 18 wherein said system is configured to employ natural language processing to determine a word of the utterance.

23. The apparatus of claim 18, wherein the system is configured to employ current media playing data as a context factor in applying context to the determination of the meaning of the utterance.

* * * * *